US012366033B2

(12) United States Patent
Abe et al.

(10) Patent No.: US 12,366,033 B2
(45) Date of Patent: Jul. 22, 2025

(54) DYEING DATA MANAGEMENT METHOD AND DYEING SYSTEM

(71) Applicant: NIDEK CO., LTD., Aichi (JP)

(72) Inventors: Koji Abe, Aichi (JP); Minoru Inuzuka, Aichi (JP); Motoshi Tanaka, Aichi (JP); Ryoji Shibata, Aichi (JP); Shigenobu Nakamura, Aichi (JP)

(73) Assignee: NIDEK CO., LTD., Aichi (JP)

( * ) Notice: Subject to any disclaimer, the term of this patent is extended or adjusted under 35 U.S.C. 154(b) by 545 days.

(21) Appl. No.: 17/901,394

(22) Filed: Sep. 1, 2022

(65) Prior Publication Data

US 2023/0074453 A1 Mar. 9, 2023

(30) Foreign Application Priority Data

Sep. 3, 2021 (JP) .................. 2021-143810

(51) Int. Cl.
*B29D 11/00* (2006.01)
*B41J 2/01* (2006.01)
*D06P 5/28* (2006.01)

(52) U.S. Cl.
CPC ........ *D06P 5/004* (2013.01); *B29D 11/00009* (2013.01); *B29D 11/00423* (2013.01); *B29D 11/00903* (2013.01); *B29D 11/00951* (2013.01); *B29D 11/0098* (2013.01); *B41J 2/01* (2013.01)

(58) Field of Classification Search
CPC .............. D06P 5/004; B29D 11/00009; B29D 11/00423; B29D 11/00903; B29D 11/00951; B29D 11/0098; B41J 2/01
See application file for complete search history.

(56) References Cited

U.S. PATENT DOCUMENTS

| 5,052,337 A | 10/1991 | Talcott et al. |
| 5,335,187 A | 8/1994 | Koizumi et al. |
| (Continued) |

FOREIGN PATENT DOCUMENTS

| JP | 4-226420 A | 8/1992 |
| JP | 11-152689 A | 6/1999 |
| (Continued) |

OTHER PUBLICATIONS

Communication dated Jun. 10, 2025, issued by Japanese Patent Office in Japanese Application No. 2021-143810.

*Primary Examiner* — Yaovi M Ameh
(74) *Attorney, Agent, or Firm* — Sughrue Mion, PLLC (57) ABSTRACT

A dyeing data management method is performed between dyeing systems disposed at different locations. The method includes a first dyeing step of dyeing a lens in a first dyeing system, a first acquisition step of acquiring first result color information of the lens dyed in the first dyeing system, a dyeing data creation step of creating dyeing data based on a discharge amount of dye in the first dyeing step and the first result color information, a data provision step of providing the dyeing data for dyeing a lens to a predetermined color from the first dyeing system to a second dyeing system, a second dyeing step of performing dyeing of a lens according to the provided dyeing data in the second dyeing system, and a second acquisition step of acquiring second result color information of the lens dyed in the second dyeing system.

11 Claims, 4 Drawing Sheets

(56) References Cited

U.S. PATENT DOCUMENTS

| | | | | |
|---|---|---|---|---|
| 5,820,673 A | * | 10/1998 | Sentilles | B29D 11/00865 |
| | | | | 118/643 |
| 2003/0063256 A1 | | 4/2003 | Inuzuka | |
| 2008/0078037 A1 | * | 4/2008 | Inuzuka | D06P 1/0016 |
| | | | | 8/470 |
| 2021/0032809 A1 | * | 2/2021 | Shibata | B29D 11/00009 |

FOREIGN PATENT DOCUMENTS

| | | | | |
|---|---|---|---|---|
| JP | 2000-325840 A | | 11/2000 | |
| JP | 2003-107410 A | | 4/2003 | |
| JP | 2011209645 A | * | 10/2011 | ......... B05B 13/0221 |
| JP | 2021-21183 A | | 2/2021 | |

* cited by examiner

FIG. 1

DYEING DATA MANAGEMENT METHOD AND DYEING SYSTEM

CROSS-REFERENCE TO RELATED APPLICATIONS

This application claims priority from Japanese Patent Application No. 2021-143810 filed on Sep. 3, 2021, the entire subject-matter of which is incorporated herein by reference.

TECHNICAL FIELD

The present disclosure relates to a dyeing data management method performed in a dyeing system and the dyeing system for dyeing a lens.

BACKGROUND ART

A technique in which a lens is dyed by transferring a dye to a surface of the lens and heating the lens to which the dye is adhered has been proposed. In a transfer dyeing method, in order to dye the lens to a predetermined color to be dyed, the dye is required to be printed on a base body by a printing device with a discharge amount corresponding to the predetermined color. Here, even when the printing device is controlled to print the dye with the discharge amount corresponding to the predetermined color, the color of the dyed lens may not be the predetermined color depending on the individual difference in the printing device, the change in the state of the printing device due to use, the installation environment of the dyeing system (for example, temperature), and the individual difference in the heating unit for heating the lens.

The dyeing system described in JP2021-21183A corrects the discharge amount of dye to be determined thereafter (that is, the discharge amount of dye to dye the lens to the predetermined color), depending on the predetermined color to be dyed and the color of lens actually dyed (result color). As a result, the lens is appropriately dyed to the predetermined color.

According to the technique described in JP2021-21183A, it is possible to improve the dyeing quality in each dyeing system. Here, even in a case where a large number of lenses are dyed in the plurality of dyeing systems disposed at different locations, it is more useful when the dyeing quality can be uniformly improved in the entire plurality of dyeing systems.

SUMMARY OF INVENTION

A typical object of the present disclosure is to provide a dyeing data management method and a dyeing system capable of uniformly improving a dyeing quality in an entire plurality of dyeing systems disposed at different locations.

A dyeing data management method performed between a plurality of dyeing systems disposed at different locations,
in which each of the dyeing systems includes:
  a printing device that prints a dye on a base body;
  a transfer device that transfers the dye to a lens in a state where the lens faces the base body on which the dye is printed;
  a dye fixing device that heats the lens to which the dye is transferred to fix the dye to the lens;
  a color information measuring instrument that measures color information of the lens to which the dye is fixed; and
  a controller, and
the dyeing data management method includes:
  a first dyeing step of dyeing a lens with using a first printing device, a first transfer device, and a first dye fixing device of a first dyeing system out of the plurality of dyeing systems;
  a first result color information acquisition step of acquiring first result color information, which is color information of the lens dyed in the first dyeing step, with using a first color information measuring instrument of the first dyeing system;
  a dyeing data creation step of creating dyeing data, which defines a discharge amount of dye on a base body by the printing device for dyeing a lens to a predetermined color to be dyed, based on a discharge amount of dye discharged from the first printing device in the first dyeing step and the first result color information acquired in the first result color information acquisition step;
  a data provision step of providing the dyeing data for dyeing a lens to the predetermined color, from the first dyeing system to a second dyeing system which is one out of the plurality of dyeing systems;
  a second dyeing step of performing dyeing of a lens according to the provided dyeing data, with using a second printing device, a second transfer device, and a second dye fixing device of the second dyeing system; and
  a second result color information acquisition step of acquiring second result color information, which is color information of the lens dyed in the second dyeing step, with using a second color information measuring instrument of the second dyeing system.

A dyeing system that dyes a lens, including:
  a printing device that prints a dye on a base body;
  a transfer device that transfers the dye to a lens in a state where the lens faces the base body on which the dye is printed;
  a dye fixing device that heats the lens to which the dye is transferred to fix the dye to the lens;
  a color information measuring instrument that measures color information of the lens to which the dye is fixed; and
  a controller,
  in which the dyeing system carries out:
  a dyeing step of dyeing the lens with using the printing device, the transfer device, and the dye fixing device;
  a first result color information acquisition step of acquiring first result color information, which is color information of the lens dyed in the dyeing step, with using the color information measuring instrument;
  a dyeing data creation step of creating dyeing data, which defines a discharge amount of dye on the base body by the printing device for dyeing a lens to a predetermined color to be dyed, based on a discharge amount of dye discharged from the printing device in the dyeing step and the first result color information acquired in the first result color information acquisition step;
  a data provision step of providing the dyeing data for dyeing a lens to the predetermined color to another dyeing system;
  a second result color information acquisition step of acquiring second result color information, which is color information of a lens actually dyed by the another dyeing system according to the dyeing data, from the another dyeing system;

a comparison step of comparing the second result color information acquired in the second result color information acquisition step with information of the predetermined color; and a correction step of correcting the dyeing data based on a comparison result in the comparison step to bring a color of a lens dyed in a subsequent dyeing step in the another dyeing system closer to the predetermined color.

A dyeing system that dyes a lens, including:

a printing device that prints a dye on a base body;

a transfer device that transfers the dye to a lens in a state where the lens faces the base body on which the dye is printed;

a dye fixing device that heats the lens to which the dye is transferred to fix the dye to the lens;

a color information measuring instrument that measures color information of the lens to which the dye is fixed; and a controller, in which the dyeing system carries out:

a dyeing data acquisition step of acquiring information of a predetermined color to be dyed and dyeing data, which defines a discharge amount of dye on the base body by the printing device for dyeing a lens to the predetermined color, from another dyeing system;

a dyeing step of performing dyeing of a lens according to the dyeing data, with using the printing device, the transfer device, and the dye fixing device;

a result color information acquisition step of acquiring result color information, which is color information of the lens dyed in the dyeing step, with using the color information measuring instrument;

a comparison step of comparing the result color information acquired in the result color information acquisition step with information of the predetermined color; and a correction step of correcting the dyeing data based on a comparison result in the comparison step to bring a color of a lens dyed in a subsequent dyeing step closer to the predetermined color.

According to the dyeing data management method and the dyeing system according to the present disclosure, the dyeing quality is uniformly improved in the entire plurality of dyeing systems disposed at different locations.

DESCRIPTION OF EMBODIMENTS

<Overview>

Each of a plurality of dyeing systems exemplified in the present disclosure is provided with a printing device, a transfer device, a dye fixing device, a color information measuring instrument, and a controller. The printing device prints a dye on a base body. The transfer device transfers the dye to a lens in a state where the lens faces the base body on which the dye is printed. The dye fixing device heats the lens to which the dye is transferred to fix the dye to the lens. The color information measuring instrument measures color information of the lens to which the dye is fixed. The controller controls the dyeing system. The plurality of dyeing systems includes a first dyeing system and a second dyeing system. The printing device, the transfer device, the dye fixing device, the color information measuring instrument, and the controller included in the first dyeing system are referred to as a first printing device, a first transfer device, a first dye fixing device, a first color information measuring instrument, and a first controller. The printing device, the transfer device, the dye fixing device, the color information measuring instrument, and the controller included in the second dyeing system are referred to as a second printing device, a second transfer device, a second dye fixing device, a second color information measuring instrument, and a second controller.

In the plurality of dyeing systems, a first dyeing step, a first result color information acquisition step, a dyeing data creation step, a data provision step, a second dyeing step, and a second result color information acquisition step are carried out. In the first dyeing step, the lens is dyed with using the first printing device, the first transfer device, and the first dye fixing device of the first dyeing system. In the first result color information acquisition step, the first color information measuring instrument of the first dyeing system acquires the first result color information which is the color information of the lens dyed in the first dyeing step. In the dyeing data creation step, dyeing data, which defines the discharge amount of dye on the base body with using the printing device for dyeing the lens to the predetermined color to be dyed, is created based on the discharge amount of dye discharged from the first printing device in the first dyeing step and the first result color information acquired in the first result color information acquisition step. In the data provision step, the dyeing data for dyeing the lens to the predetermined color is provided from the first dyeing system to the second dyeing system. In the second dyeing step, the second printing device, the second transfer device, and the second dye fixing device of the second dyeing system perform dyeing of the lens according to the dyeing data provided from the first dyeing system. In the second result color information acquisition step, the second color information measuring instrument of the second dyeing system acquires the second result color information which is the color information of the lens dyed in the second dyeing step.

According to the dyeing system of the present disclosure, dyeing data for dyeing the lens to a predetermined color is created based on the discharge amount of dye when the lens is dyed in the first dyeing system and the first result color information of the lens actually dyed. The created dyeing data is provided from the first dyeing system to the second dyeing system. In the second dyeing system, the lens is actually dyed based on the provided dyeing data, and the second result color information which is the color information of the dyed lens is acquired. Therefore, the result of dyeing by the dyeing data provided from the first dyeing system to the second dyeing system is confirmed from the second result color information based on the result of the dyeing of the lens actually performed, in addition to sharing the dyeing data between the first dyeing system and the second dyeing system. Therefore, the dyeing quality is uniformly improved in the entire plurality of dyeing systems.

According to the dyeing system of the present disclosure, the dyeing data created at each location can be appropriately applied to other locations. For example, dyeing data can be appropriately shared between a main dyeing system that controls dyeing of a lens in a plurality of dyeing systems and a sub-dyeing system that carries out a dyeing step of a lens in response to an instruction from the main dyeing system. For example, the dyeing data created by the main dyeing system can be appropriately applied to the sub-dyeing systems disposed at different locations.

In the present disclosure, as a transfer method in which the dye is transferred to the lens, a vapor phase transfer method in which the dye is transferred to the lens by sublimating a sublimable dye printed on a base body is exemplified in a state where the lens and the dye-provided base body face each other in a vacuum in a non-contact manner. However, it is also possible to change the transfer method. For example, the dye may be transferred to the lens in a state where the dye-provided base body is in contact with the lens.

A specific method for providing the dyeing data from the first dyeing system to the second dyeing system can be appropriately selected. For example, the first dyeing system may provide the dyeing data by transmitting the dyeing data to the second dyeing system via a network. In addition, the dyeing data may be provided to the second dyeing system via a storage medium (for example, USB memory, CD-R, and the like) that can be attached to and detached from the device.

A comparison step of comparing the second result color information acquired in the second result color information acquisition step with information of the predetermined color may be further carried out. In this case, it is appropriately confirmed whether or not the predetermined color is accurately dyed on the lens based on the dyeing data, based on the comparison result of the second result color information and the information of the predetermined color. As a result, the dyeing quality is further improved.

The comparison result between the second result color information and the information of the predetermined color may be output by various methods. For example, the comparison result may be output by displaying the comparison result on a display unit. In addition, the comparison result may be output by transmitting the comparison result to another dyeing system.

At least one of the plurality of dyeing systems may further carry out a correction step. In the correction step, the dyeing data is corrected based on the comparison result in the comparison step, so that the color of the lens dyed in the subsequent dyeing step in the second dyeing system is brought closer to the predetermined color. That is, the dyeing data is corrected based on the comparison result of the information of the predetermined color and the second result color information so that the color closer to the predetermined color set in the first dyeing system is dyed on the lens in the second dyeing system. Therefore, the difference in the dyeing quality of the lens between the first dyeing system and the second dyeing system is further suppressed.

A specific method of the correction step can be appropriately selected. For example, the controller may automatically correct the dyeing data based on at least one of the difference or the ratio between the result color information and the color information of the predetermined color. In addition, the controller may output a comparison result of the result color information and the information of the predetermined color, and may correct the dyeing data in response to an instruction input from the operator who has confirmed the output comparison result. That is, the operator may manually correct the dyeing data.

For example, the controller may correct the dye data by correcting the determination procedure for determining the discharge amount of dye required to dye the lens in a specific color. Various procedures can be adopted for the determination procedure for determining the discharge amount of dye (that is, algorithm for determining the discharge amount of dye). For example, a table for associating each color that dyes the lens with the discharge amount of each dye may be stored in the storage device. The controller may determine the discharge amount by acquiring the discharge amount of each dye corresponding to the color to be dyed from the table. In this case, in the correction step, the determination procedure may be corrected by correcting the information in the table. In addition, information of the discharge amount of each dye (base color information) for dyeing the lens with each of a plurality of dyes having different colors (for example, Red, Yellow, and Blue) at a predetermined concentration may be stored in the storage device. The controller may determine the discharge amount by calculating the discharge amount of each dye for dyeing a specific color based on the base color information. In this case, in the correction step, the determination procedure may be corrected by correcting the base color information.

The predetermined color may be a color having a predetermined concentration, which is dyed with one specific dye among a plurality of dyes that can be discharged from the printing device. In the correction step, the controller may correct the dyeing data based on the concentration indicated by the result color information and the concentration of the predetermined color. In this case, the discharge amount of dye is corrected so that the lens is appropriately dyed at a predetermined concentration for a specific dye. Therefore, the color dyed with a specific dye is appropriately dyed on the lens at a predetermined concentration.

The controller may repeatedly carry out the correction step with each of the plurality of dyes that can be discharged from the printing device as a specific dye. In this case, for each of the plurality of dyes, the discharge amount is corrected so that the lens is appropriately dyed at a predetermined concentration. Therefore, a large number of colors expressed by the combination of the plurality of dyes are appropriately dyed on the lens.

In addition, the predetermined color may be a color having a predetermined concentration, which is dyed by a combination of a plurality of dyes that can be discharged from the printing device. In the correction step, the controller may correct the discharge amount of at least one of the plurality of dyes based on the result color information and the predetermined color. In this case, it is also possible to collectively correct the discharge amounts of the plurality of dyes.

The controller of the first dyeing system may acquire the second result color information from the second dyeing system and carry out the comparison step and the correction step based on the acquired second result color information. In this case, the dyeing data used in the second dyeing system is corrected on the first dyeing system side where the dyeing data is created. Therefore, it is easy to manage the dyeing data in the second dyeing system on the first dyeing system side. In addition, even in a case where the operator on the second dyeing system side is not familiar with the work, it is possible to appropriately correct the dyeing data on the first dyeing system side.

A correction data provision step of providing the dyeing data corrected in the correction step, from the first dyeing system to the second dyeing system may be further carried out. In this case, the dyeing data corrected on the first dyeing system side is appropriately used in the second dyeing system.

The controller of the second dyeing system may carry out the comparison step and the correction step. In this case, the dyeing data used in the second dyeing system is appropriately corrected in the second dyeing system itself.

The controller of the second dyeing system may transmit at least one of the comparison result in the comparison step and the correction result of the dyeing data in the correction step to the controller of the first dyeing system. In this case, the result of at least one of the comparison step and the correction step carried out in the second dyeing system is also shared in the first dyeing system. As a result, the status of dyeing in the second dyeing system is appropriately managed in the first dyeing system.

In a case where the dyeing data is corrected in the correction step, the dyeing data in the database that stores the dyeing data of the plurality of dyeing systems may be updated based on the correction result. In this case, the dyeing data of each of the plurality of dyeing systems is appropriately collectively managed in the database. Therefore, the dyeing quality is uniformly improved in the entire plurality of dyeing systems.

In the dyeing data creation step, dyeing data may be created for each type of lens to be dyed (for example, at least one of the type of the base material of the lens, the shape of the lens, the thickness of the lens, the power of the lens, and the like). In the data provision step, dyeing data may be provided to the second dyeing system in association with the type of the lens to be dyed. In the second dyeing system, a lens with a type corresponding to the dyeing data may be dyed according to the provided dyeing data. In this case, the dyeing data is managed between the plurality of dyeing systems according to the type of the lens. Therefore, the dyeing quality of the lens in the plurality of dyeing systems is further improved.

In a case where the dyeing data is created according to the type of the lens, the dyeing data corresponding to the type of the lens may be corrected based on the comparison result also in the correction step. In this case, the dyeing data corresponding to the type of lens is appropriately corrected.

However, the dyeing data may be created regardless of the type of the lens. Even in this case, according to the technique of the present disclosure, the dyeing quality is uniformly improved in the entire plurality of dyeing systems.

The color information measuring instrument may be a spectroscopic measuring instrument that measures the spectral spectrum of the lens as color information. In this case, as compared with the case where the RGB camera or the like is used as the color information measuring instrument, the color information in which the influence of the lighting environment or the like is suppressed is acquired. Therefore, the dyeing quality is further improved. In addition, even in a case where the lens is dyed using a plurality of dyes, the spectral spectrum which is the distribution of the intensity for each wavelength is acquired, so that the discharge amount of each of the plurality of dyes is appropriately corrected.

A specific method for correcting the dyeing data based on the spectral spectrum can also be appropriately selected. For example, the controller may acquire the spectral transmittance of the dyed lens as the result color information, and correct the dyeing data (discharge amount of dye) based on the transmittance of the maximum absorption peak of each dye and the transmittance of the predetermined color. That is, the controller may increase the discharge amount of the specific dye from before the correction when the transmittance of a color dyed with a specific dye is higher than expected, and may decrease the discharge amount of the specific dye from before the correction when the transmittance is lower than expected. In a case where the lens is dyed with the plurality of dyes, the controller may correct the discharge amount for each dye based on the transmittance of the maximum absorption peak of each dye.

However, a measuring instrument other than the spectroscopic measuring instrument (for example, RGB camera or the like) may be used as the color information measuring instrument. In addition, by combining a normal camera and an RGB filter, the spectral characteristic of the lens may be estimated as color information.

A first aspect of the dyeing system carries out a first dyeing step, a first result color information acquisition step, a dyeing data creation step, a data provision step, a result acquisition step, a comparison step, and a correction step. In the first dyeing step, the lens is dyed with using the printing device, the transfer device, and the dye fixing device. In the first result color information acquisition step, the color information measuring instrument acquires the first result color information which is the color information of the lens dyed in the first dyeing step. In the dyeing data creation step, dyeing data, which defines the discharge amount of dye on the base body with using the printing device for dyeing the lens to the predetermined color to be dyed, is created based on the discharge amount of dye discharged from the printing device in the first dyeing step and the first result color information acquired in the first result color information acquisition step. In the data provision step, the dyeing data for dyeing the lens to the predetermined color is provided to the second dyeing system which is another dyeing system. In the result acquisition step, the second result color information, which is the color information of the lens actually dyed in the second dyeing system according to the dyeing data, is acquired from the second dyeing system. In the comparison step, the second result color information acquired in the result acquisition step is compared with the information of the predetermined color. In the correction step, the dyeing data is corrected based on the comparison result in the comparison step, so that the color of the lens dyed in the subsequent dyeing step in the second dyeing system is brought closer to the predetermined color.

In this case, the result of dyeing by the dyeing data provided from the first dyeing system to the second dyeing system is confirmed from the second result color information based on the result of the dyeing of the lens actually performed, in addition to sharing the dyeing data between the first dyeing system and the second dyeing system. Furthermore, the dyeing data is corrected based on the comparison result of the information of the predetermined color and the second result color information so that the color closer to the predetermined color set in the first dyeing system is dyed on the lens in the second dyeing system. Therefore, the dyeing quality is uniformly improved in the entire plurality of dyeing systems.

A second aspect of the dyeing system carries out a dyeing data acquisition step, a second dyeing step, a second result color information acquisition step, a comparison step, and a correction step. In the dyeing data acquisition step, information of the predetermined color to be dyed and dyeing data that defines the discharge amount of dye on the base body with using the printing device for dyeing the lens to the predetermined color are acquired from another dyeing system. In the second dyeing step, the printing device, the transfer device, and the dye fixing device perform dyeing of the lens according to the dyeing data. In the second result color information acquisition step, the color information measuring instrument acquires the second result color information which is the color information of the lens dyed in the second dyeing step. In the comparison step, the second result color information acquired in the second result color information acquisition step is compared with the information of the predetermined color. In the correction step, the dyeing data is corrected based on the comparison result in the comparison step, so that the color of the lens dyed in the subsequent dyeing step is brought closer to the predetermined color.

In this case, in addition to sharing the dyeing data between the plurality of dyeing systems, the result of dyeing by the dyeing data is confirmed from the second result color information. Furthermore, the dyeing data is corrected based on the comparison result of the information of the predetermined color and the second result color information so that the color closer to the predetermined color is dyed on the lens in the second dyeing system. Therefore, the dyeing quality is uniformly improved in the entire plurality of dyeing systems.

<Embodiment>

Hereinafter, one of the typical embodiments according to the present disclosure will be described with reference to the drawings.

In the present embodiment, a plurality of dyeing systems 1A and 1B are used. Each of the plurality of dyeing systems 1A and 1B automatically and continuously dyes a lens (specifically, plastic lens used for eyeglasses). At least a part of the techniques exemplified in the present disclosure can also be applied to a case of dyeing a resin body other than a spectacle lens. For example, in a case of dyeing various resin bodies such as a goggle, a mobile phone cover, a light cover, an accessory, a toy, a film (for example, thickness of 400 μm or less), a plate material (for example, thickness of 400 μm or more), and the like, it is also possible to apply at least a part of the techniques exemplified in the present disclosure. The resin body to be dyed also includes a resin body added to a member (for example, wood or glass) different from the resin body.

(Schematic Configuration)

Figure 1:
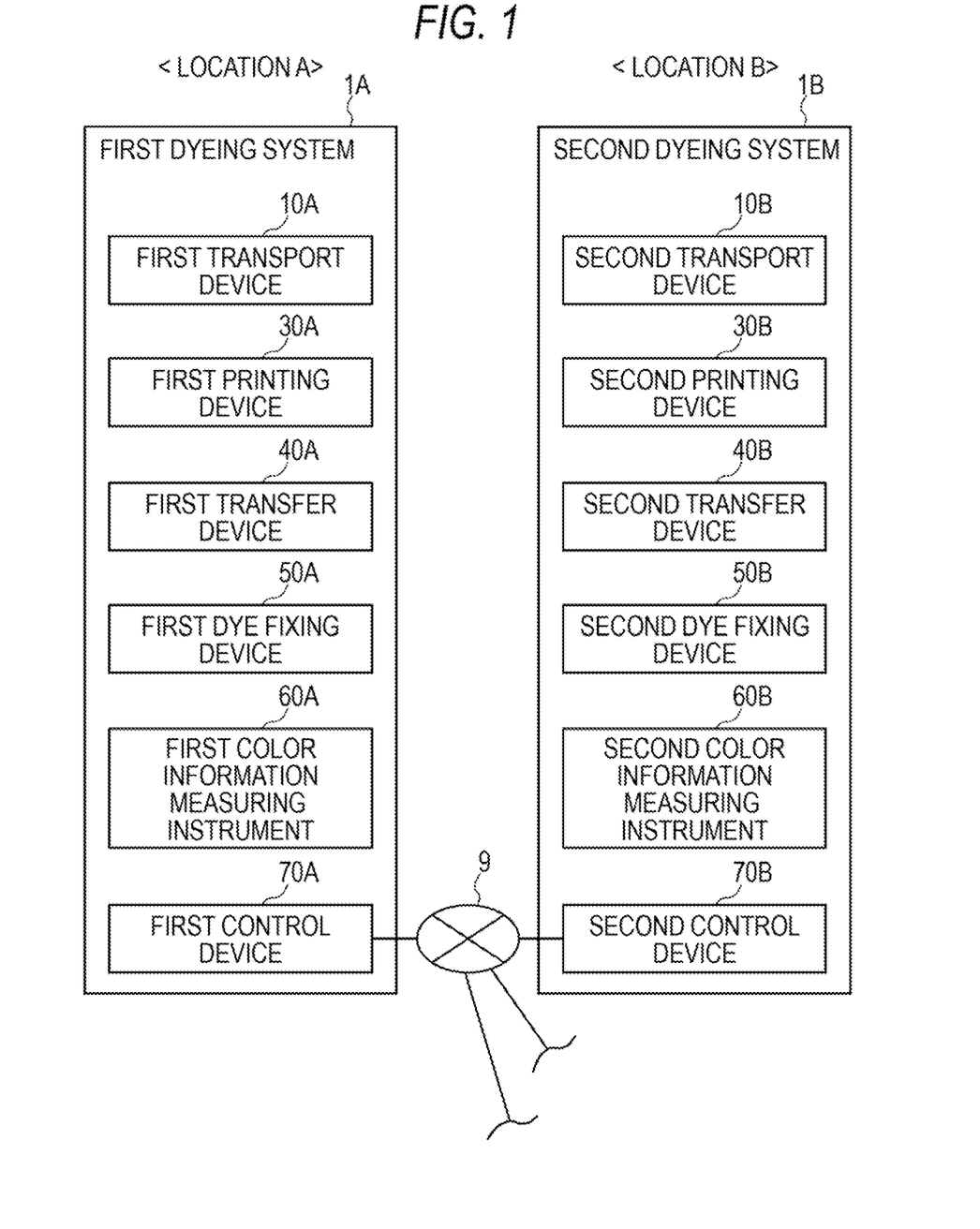
FIG. 1 is a block diagram illustrating a schematic configuration of a plurality of dyeing systems 1A and 1B.

A schematic configuration of the plurality of dyeing systems 1A and 1B in the present embodiment will be described with reference to FIG. 1. In the present embodiment, the case where two dyeing systems (first dyeing system 1A and second dyeing system 1B) are used will be exemplified. However, the techniques exemplified in the present embodiment can also be applied in a case where three or more dyeing systems are used.

The first dyeing system 1A is provided with a first transport device 10A, a first printing device 30A, a first transfer device 40A, a first dye fixing device 50A, a first color information measuring instrument 60A, and a first control device 70A. In addition, the second dyeing system 1B is provided with a second transport device 10B, a second printing device 30B, a second transfer device 40B, a second dye fixing device 50B, a second color information measuring instrument 60B, and a second control device 70B. Details of these will be described later.

The plurality of dyeing systems (in the present embodiment, two dyeing systems 1A and 1B) are connected to each other via a network (for example. Internet or the like) 9. As an example, in the present embodiment, the first control device 70A included in the first dyeing system 1A and the second control device 70B included in the second dyeing system 1B are connected to each other via the network 9.

The first dyeing system 1A and the second dyeing system 1B are disposed at different locations. In the present embodiment, the first dyeing system 1A is disposed at a location A and the second dyeing system 1B is disposed at a location B. Details will be described later, and according to the technique exemplified in the present disclosure, for example, even in a case where the country where the first dyeing system 1A is disposed and the country where the second dyeing system 1B is disposed are different from each other, the dyeing quality is uniformly improved in the entire plurality of dyeing systems 1A and 1B.

In the present embodiment, the first dyeing system 1A is disposed at the main location that controls the dyeing of the lenses in the plurality of dyeing systems 1A and 1B. Therefore, the first dyeing system 1A can also be expressed as the main dyeing system. In addition, the second dyeing system 1B is disposed at a sub-location that carries out a lens dyeing step in response to an instruction from the main location. Therefore, the second dyeing system 1B can also be expressed as a sub-dyeing system.

(System Configuration)

Figure 2:
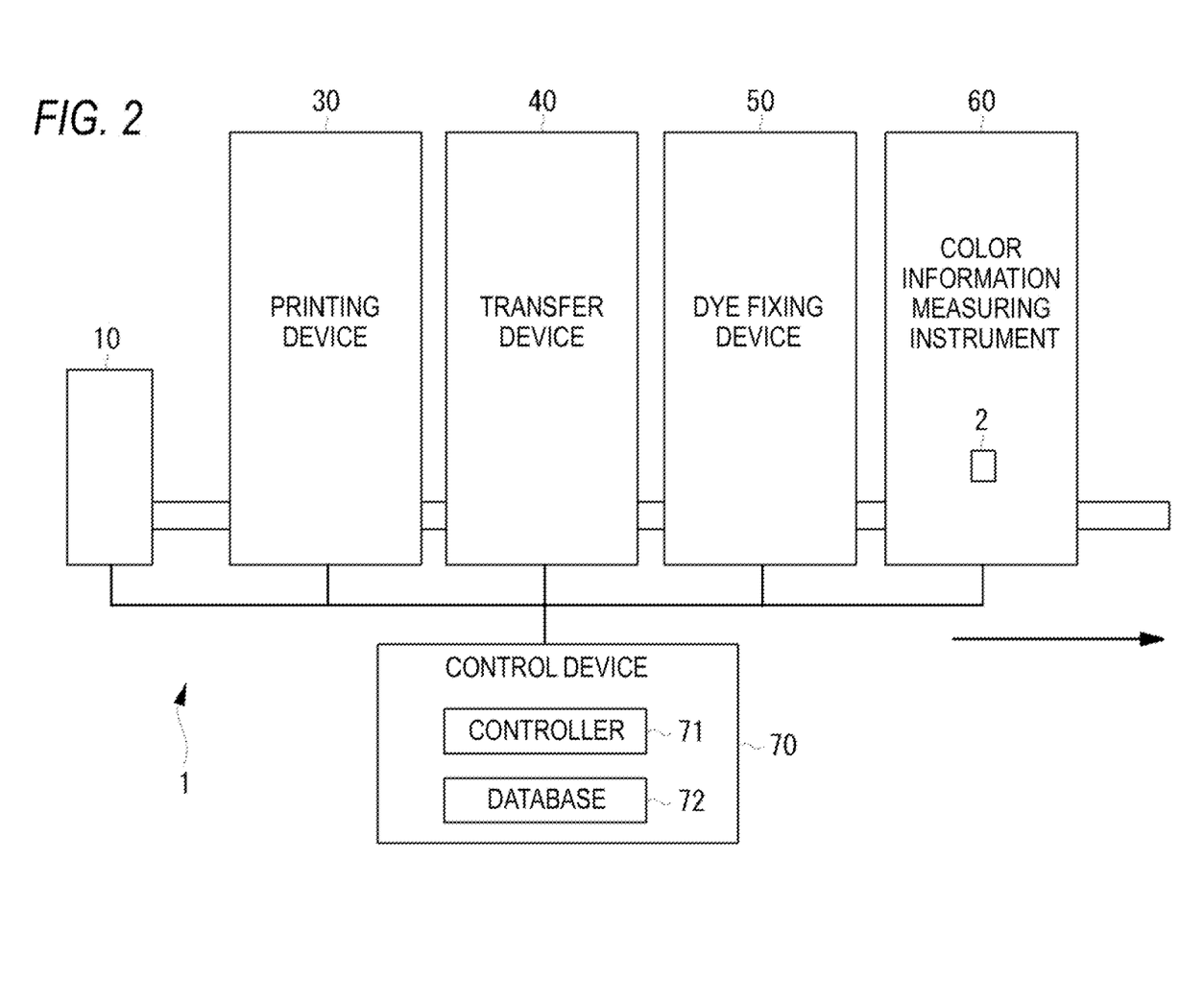
FIG. 2 is a block diagram illustrating a system configuration of dyeing systems 1 (1A, 1B).

The system configuration of the dyeing system 1 (1A, 1B) of the present embodiment will be described with reference to FIG. 2. In the present embodiment, the same configuration can be adopted for the first dyeing system 1A and the second dyeing system 1B. Therefore, in order to simplify the description, the first dyeing system 1A and the second dyeing system 1B will be collectively described. The dyeing system 1 (1A, 1B) of the present embodiment is provided with a transport device 10 (first transport device 10A, second transport device 10B), a printing device 30 (first printing device 30A, second printing device 30B), a transfer device 40 (first transfer device 40A, second transfer device 40B), a dye fixing device 50 (first dye fixing device 50A, second dye fixing device 50B), a color information measuring instrument 60 (first color information measuring instrument 60A, second color information measuring instrument 60B), and a control device 70 (first control device 70A, second control device 70B).

The transport device 10 transports a dyeing tray on which the lens L, which is a resin body, is placed, to each device in the dyeing system 1. Specifically, the transport device 10 of the present embodiment continuously transports a plurality of dyeing trays in the entire dyeing system 1. The transport device 10 of the present embodiment transports the dyeing tray in the order of the printing device 30, the transfer device 40, the dye fixing device 50, and the color information measuring instrument 60 (that is, from left to right in FIG. 2).

The printing device 30 prints a dye (in the present embodiment, ink containing a dye) on a sheet-shaped base body. In the present embodiment, a paper or a metallic film (made of aluminum in the present embodiment) having an appropriate hardness is used as the base body. However, other materials such as glass plate, heat-resistant resin, and ceramic can be used as the material of the base body. In the dyeing system 1 of the present embodiment, in order to appropriately transfer the dye to the lens L while preventing the dye from agglomerating, and the like, the dye is transferred (deposited) to the surface of the lens by heating the dye on the base body in a state where the base body and the lens are separated from each other and face each other in a vacuum (including substantially vacuum) environment (the dyeing method in the present embodiment is referred to as a vapor phase transfer dyeing method). Therefore, in the printing device 30, an ink jet printer that prints ink containing a sublimation dye on the base body is used. The printing device 30 performs printing based on print data (dyeing data) created by the control device 70 which is an information processing device (in the present embodiment, personal computer (hereinafter referred to as "PC"). As a result, an appropriate amount of ink (dye) adheres to an appropriate position of the base body. It is also easy to prepare the dye-provided base body for performing gradation dyeing.

It is also possible to change the configuration of the printing device 30. For example, the printing device may be a laser printer. In this case, a toner may contain a sublimation dye. In addition, the dye may be adhered to the base body with using a dispenser (liquid quantitative coating device), a roller, or the like.

The transfer device 40 transfers the dye from the base body to the lens in a state where the dye adhering to the base body faces the lens. As described above, in the present embodiment, the dye is transferred from the base body to the lens by the vapor phase transfer method. However, it is also possible to change the method of transferring the dye to the lens. For example, the dye may be transferred from the base body to the lens in a state where the dye of the base body and the lens are in contact with each other.

The dye fixing device 50 heats the lens to which the dye is transferred by the transfer device 40 to fix the dye adhering to the surface of the lens to the lens. The dye fixing device 50 of the present embodiment heats the lens by irradiating the lens with a laser beam which is an electromagnetic wave. However, a device (for example, oven or the like) that irradiates the lens with an electromagnetic wave other than the laser beam may be used as the dye fixing device.

The color information measuring instrument 60 is used to measure the color information of the lens to which the dye is fixed by the dye fixing device 50. The color information measuring instrument 60 of the present embodiment measures the color information of the lens after lowering the temperature of the lens heated by the dye fixing device 50.

The color information measuring instrument 60 of the present embodiment is a spectroscopic measuring instrument that measures the spectral spectrum of the lens (specifically, transmission spectrum in the present embodiment) as color information. Therefore, as compared with the case of using an RGB camera or the like, the color information is acquired in a state where the influence of disturbance light such as a lighting environment is suppressed. In addition, even in a case where the lens is dyed with a plurality of dyes, the spectral spectrum which is the distribution of the intensity for each wavelength is acquired, so that the color information of the dyed lens is appropriately acquired. Using the acquired spectral spectrum data, values such as CIEL*a*b* color system, XYZ color system, L*C*h* color system, and Munsell color system may be used. However, a device other than the spectroscopic measuring instrument (for example, RGB camera or the like) may be used as the color information measuring instrument.

The control device 70 controls various types of control in the dyeing system 1. As the control device 70, various information processing devices (for example, at least one of a PC, a server, a mobile terminal, and the like) can be used. The control device 70 is provided with a controller (for example, CPU or the like) 71 that controls control, and a database 72 that stores various data. It is also possible to change the configuration of the control device 70. First, a plurality of devices may cooperate to function as the control device 70. For example, a control device that controls various types of control in the dyeing system 1 and a control device including the database 72 may be different devices.

In addition, the controllers of a plurality of devices may cooperate to perform various types of control in the dyeing system 1. For example, in many cases, at least one of the transport device 10, the printing device 30, the transfer device 40, and the dye fixing device 50 is provided with a controller. In this case, the controller of the control device 70 and the controller of another device may cooperate to control the dyeing system 1. In addition, instead of the database 72, a server provided outside the dyeing system 1 (for example, cloud server or the like) may be used.

The dyeing system 1 is provided with a reading unit 2 that reads information on the lens to be dyed for each unit to be transported (including a dyeing tray and a lens placed on the dyeing tray). As an example, the reading unit 2 of the present embodiment is an identifier reading unit that reads an identifier provided for each unit to be transported (for example, for each dyeing tray). The unit is specified with the identifier read by the reading unit 2. By specifying the unit, information of the predetermined color corresponding to the lens L included in the unit and the like are set.

First Embodiment

Dyeing data management processing performed in the dyeing systems 1A and 1B of the first embodiment will be described with reference to FIG. 3. In the first embodiment, the dyeing data used in the second dyeing system 1B is corrected in the first dyeing system 1A disposed at the main location.

First, the first printing device 30A, the first transfer device 40A, and the first dye fixing device 50A of the first dyeing system 1A carry out a first dyeing step for dyeing a lens in a specific color (S1). Specifically, the first transport device 10A of the first dyeing system 1A transports the dyeing tray on which the lens is placed in the order of the first printing device 30A, the first transfer device 40A, the first dye fixing device 50A, and the first color information measuring instrument 60A. During this period, the first printing device 30A first prints the dye on a two-dimensional region of the surface of the base body with the discharge amount corresponding to the color of the lens to be dyed. That is, among a plurality of pixels spreading in two dimensions, at least one of the plurality of dyes having different colors from each other is printed on each of the pixels to which the dye is applied with the discharge amount determined by the print data. Next, the first transfer device 40A transfers the dye printed on the base body to the surface of the lens. Specifically, the first transfer device 40A heats the dye of the base body with electromagnetic waves in a state where the base body faces the lens in a non-contact manner and the base body and the periphery of the lens are in a substantially vacuum state. As a result, the dye printed on the base body is sublimated and transferred to the surface of the lens. Next, the first dye fixing device 50A heats the lens and diffuses the dye adhering to the surface of the lens into the inside of the lens to fix the dye to the lens.

Next, the first color information measuring instrument 60A of the first dyeing system 1A measures (acquires) the first result color information which is the color information of the lens dyed in the first dyeing step (S1)(S2). As an example, in the present embodiment, as the result color information (first result color information and second result color information), the spectral transmittance data (specifically, L*a*b* color space, and visual transmittance Y value) is used. The first control device 70A (controller 71 which is the first controller) of the first dyeing system 1A creates dyeing data for dyeing the lens to a predetermined color and stores the dyeing data in the database 72 based on the discharge amount of dye discharged from the first printing device 30A in the first dyeing step (S1) and the first result color information measured for the dyed lens (S3). The dyeing data is data (that is, print data) that defines the discharge amount of dye on the base body by the printing device 30 (in the present embodiment, discharge amount of ink containing the dye) for dyeing the lens to a predetermined color. For example, the first control device 70A may create the print data used for the first printing device 30A in the first dyeing step (S1) as the dyeing data, using the color indicated by the first result color information as the predetermined color.

In S3 of the present embodiment, dyeing data is created for each type of lens to be dyed (for example, type of base material of the lens to be dyed). As a result, appropriate dyeing data according to the type of the lens is created, so that the dyeing quality is improved.

Next, the first control device 70A of the first dyeing system 1A provides the dyeing data created in S3 to the second control device 70B of the second dyeing system 1B (S4). In the present embodiment, information of the predetermined color is provided to the second control device 70B with the dyeing data. In addition, in the present embodiment, the dyeing data is provided to the second control device 70B in association with the type of the lens to be dyed. The first dyeing system 1A of the present embodiment transmits the dyeing data to the second dyeing system 1B via the network 9. However, it is also possible to change a method of providing the dyeing data. For example, the dyeing data may be provided to the second dyeing system 1B via a storage medium (for example, USB memory, CD-R, and the like) that can be attached to and detached from the device.

Next, the second printing device 30B, the second transfer device 40B, and the second dye fixing device 50B of the second dyeing system 1B carry out a second dyeing step for dyeing the lens according to the dyeing data provided from the first dyeing system 1A (S6). Specifically, the second transport device 10B of the second dyeing system 1B transports the dyeing tray on which the lens is placed in the order of the second printing device 30B, the second transfer device 40B, the second dye fixing device 50B, and the second color information measuring instrument 60B. During this time, first, the second printing device 30B prints the dye on the base body according to the dyeing data provided from the first dyeing system 1A. Next, the second transfer device 40B transfers the dye printed on the base body to the lens. The second dye fixing device 50B heats the lens to fix the dye to the lens. In S6 of the present embodiment, a lens with a type corresponding to the dyeing data is dyed according to the provided dyeing data.

Next, the second color information measuring instrument 60B of the second dyeing system 1B measures (acquires) the second result color information which is the color information of the lens dyed in the second dyeing step (S6) (S7). Therefore, the result of dyeing by the dyeing data provided from the first dyeing system 1A to the second dyeing system 1B is confirmed from the second result color information based on the result of the first dyeing step (S1) actually performed, in addition to sharing the dyeing data between the first dyeing system 1A and the second dyeing system 1B. Next, the second control device 70B (controller 71 which is the second controller) of the second dyeing system 1B provides (transmits in the present embodiment) the second result color information to the first control device 70A of the first dyeing system 1A (S8).

The first control device 70A of the first dyeing system 1A compares the second result color information acquired in S8 with the information of the predetermined color corresponding to the dyeing data used in S6 (S10). As a result, it is appropriately confirmed whether or not the predetermined color is accurately dyed on the lens based on the dyeing data. In the present embodiment, as comparison processing, processing of calculating the difference between the second result color information and the color information of the predetermined color is performed. However, processing of calculating the ratio of the second result color information and the color information of the predetermined color may be used as the comparison processing.

The first control device 70A of the first dyeing system 1A determines whether or not the difference between the second result color information and the color information of the predetermined color is within the allowable range (S11). When the difference is not within the allowable range (S11: NO), the first control device 70A corrects the dyeing data used in S6 to bring the color of the lens dyed in the subsequent dyeing step in the second dyeing system 1B closer to the predetermined color based on the comparison result between the second result color information and the color information of the predetermined color (S12). In the present embodiment, the dyeing data is automatically corrected based on at least one of the difference or the ratio between the result color information and the color information of the predetermined color. In addition, the dyeing data may be corrected in response to the instruction input from the operator. For example, the dye data may be corrected by correcting the determination procedure for determining the discharge amount of dye required to dye the lens in a specific color. In S12 of the present embodiment, the dyeing data corresponding to the type of the lens is corrected.

Next, the first control device 70A updates the dyeing data used in the second dyeing system 1B to the dyeing data corrected in S12 of the databases that store the dyeing data of the plurality of dyeing systems 1A and 1B (in the present embodiment, the database 72 of the first control device 70A) (S13). As a result, the dyeing data of each of the plurality of dyeing systems 1A and 1B are appropriately collectively managed in the database 72.

Next, the first control device 70A of the first dyeing system 1A provides (transmits in the present embodiment) the dyeing data corrected in S12 to the second control device 70B of the second dyeing system 1B (S15). In the second dyeing system 1B, the processing of S6, S7, S8, S10, and S11 are performed again based on the corrected dyeing data. When the difference between the second result color information and the color information of the predetermined color is within the allowable range (S11: YES), the first control device 70A notifies the second control device 70B that the dyeing data used in the immediately preceding step S6 has been confirmed as the dyeing data used in the second dyeing system 1B (S17). As a result, the dyeing data corrected on the first dyeing system 1A side is appropriately used in the second dyeing system 1B.

As described above, in the first embodiment, the dyeing data used in the second dyeing system 1B is corrected on the first dyeing system 1A side where the dyeing data is created. Therefore, it is easy to manage the dyeing data in the second dyeing system 1B on the first dyeing system 1A side. In addition, even in a case where the operator on the second dyeing system 1B side is not familiar with the work, it is possible to appropriately correct the dyeing data on the first dyeing system 1A side.

Second Embodiment

Dyeing data management processing performed in the dyeing systems 1A and 1B of the second embodiment will be described with reference to FIG. 4. In the second embodiment, the dyeing data used in the second dyeing system 1B is corrected in the second dyeing system 1B itself. As the system configuration of the dyeing systems 1A and 1B of the second embodiment, the same configuration as the configuration of the dyeing systems 1A and 1B of the first embodiment (refer to FIGS. 1 and 2) can be adopted. Among processing illustrated in FIG. 4, the same processing as those in the first embodiment described above (refer to FIG. 3) are assigned the same step numbers and the description is simplified.

First, the first printing device 30A, the first transfer device 40A, and the first dye fixing device 50A of the first dyeing system 1A carry out a first dyeing step for dyeing a lens in a specific color (S1). Next, the first color information measuring instrument 60A of the first dyeing system 1A measures (acquires) the first result color information which is the color information of the lens dyed in the first dyeing step (S1)(S2). The first control device 70A of the first dyeing system 1A creates dyeing data for dyeing the lens to a predetermined color and stores the dyeing data in the database 72 based on the discharge amount of dye discharged from the first printing device 30A in the first dyeing step (S1) and the first result color information measured for the dyed lens (S3). The first control device 70A provides (transmits) the dyeing data created in S3 and the information of the corresponding predetermined color to the second control device 70B of the second dyeing system 1B (S4).

Next, the second printing device 30B, the second transfer device 40B, and the second dye fixing device 50B of the second dyeing system 1B carry out a second dyeing step for dyeing the lens according to the dyeing data provided from the first dyeing system 1A (S6). The second color information measuring instrument 60B of the second dyeing system 1B measures (acquires) the second result color information which is the color information of the lens dyed in the second dyeing step (S6)(S7). Therefore, the result of dyeing by the dyeing data provided from the first dyeing system 1A to the second dyeing system 1B is confirmed from the second result color information based on the result of the first dyeing step (S1) actually performed, in addition to sharing the dyeing data between the first dyeing system 1A and the second dyeing system 1B.

The second control device 70B of the second dyeing system 1B compares the second result color information acquired in S7 with the information of the predetermined color corresponding to the dyeing data used in S6 (S10). The second control device 70B determines whether or not the difference between the second result color information and the color information of the predetermined color is within the allowable range (S11). When the difference is not within the allowable range (S11: NO), the second control device 70B corrects the dyeing data used in S6 to bring the color of the lens dyed in the subsequent dyeing step in the second dyeing system 1B closer to the predetermined color based on the comparison result between the second result color information and the color information of the predetermined color.

In the second dyeing system 1B, the processing of S6, S7, S10, and S11 are performed again based on the corrected dyeing data. When the difference between the second result color information and the color information of the predetermined color is within the allowable range (S11: YES), the second control device 70B transmits at least one of the comparison result in S10 and the correction result of the dyeing data in S12 (both in the present embodiment) to the first control device 70A (S20). As a result, the status of dyeing in the second dyeing system 1B is appropriately managed in the first dyeing system 1A. Ina case where the processing (S12) for correcting the dyeing data is not performed, that fact may be notified to the first control device 70A in S20. In a case where the dyeing data is corrected, the first control device 70A updates the dyeing data used in the second dyeing system 1B among the data stored in the database to the dyeing data corrected in S12 (S21). As described above, in the second embodiment, the dyeing data used in the second dyeing system 1B is appropriately corrected in the second dyeing system 1B itself.

The techniques disclosed in the above embodiments are merely examples. Therefore, it is possible to modify the techniques exemplified in the above embodiments. For example, in the above embodiment, the dyeing data used in the second dyeing system 1B is corrected based on the comparison result of the information of the predetermined color and the second result color information. However, processing different from the processing of correcting the dyeing data may be performed based on the comparison result of the information of the predetermined color and the second result color information. For example, the comparison result may be output by displaying the comparison result on a display unit. In addition, the comparison result may be output by transmitting the comparison result to another dyeing system. In addition, processing of outputting only the second result color information (for example, at least one of display and transmission) may be performed without carrying out the comparison between the information of the predetermined color and the second result color information. Even in this case, the operator can determine whether or not the dyeing data used in the second dyeing system 1B is appropriate by confirming the second result color information.

Figure 3:
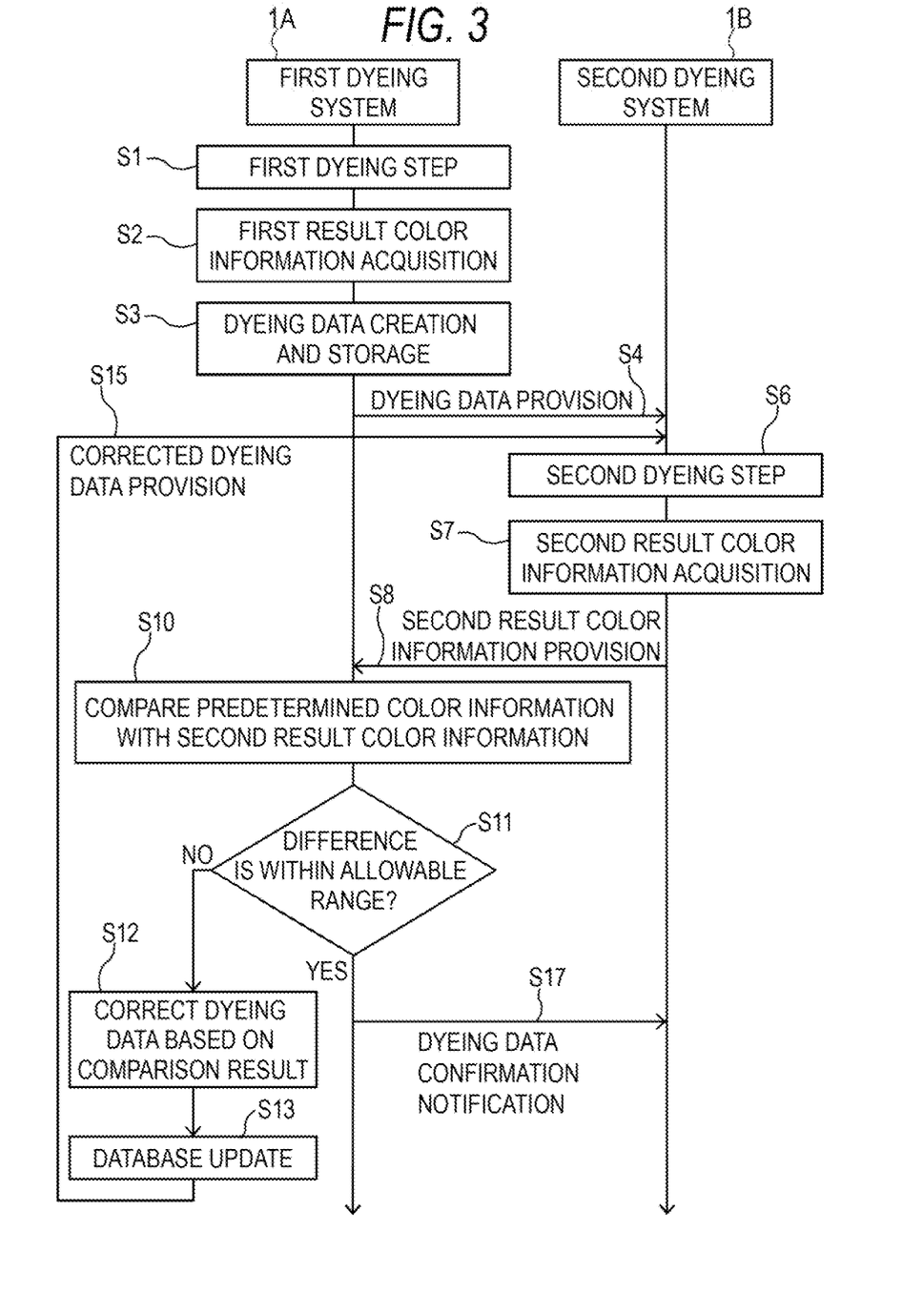
FIG. 3 is a sequence diagram illustrating an example of a flow of dyeing data management processing performed in the dyeing systems 1A and 1B of the first embodiment.
Figure 4:
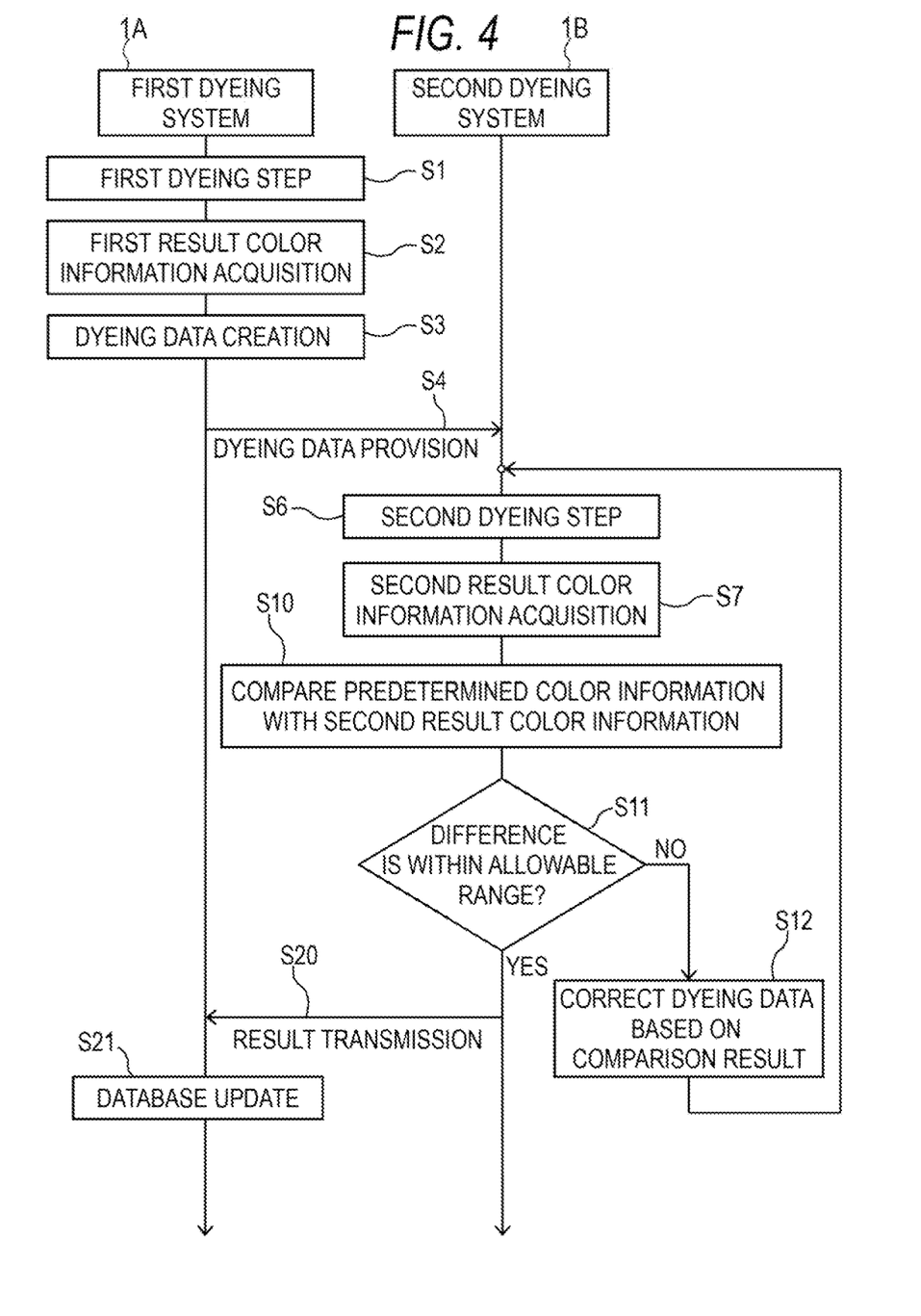
FIG. 4 is a sequence diagram illustrating an example of a flow of dyeing data management processing performed in the dyeing systems 1A and 1B of the second embodiment.

The first dyeing processing performed in S1 of FIGS. 3 and 4 is an example of the "first dyeing step". The processing of acquiring the first result color information in S2 of FIGS. 3 and 4 is an example of the "first result color information acquisition step". The processing of creating dyeing data in S3 of FIGS. 3 and 4 is an example of the "dyeing data creation step". The processing of providing the dyeing data from the first dyeing system 1A to the second dyeing system 1B in S4 of FIGS. 3 and 4 is an example of the "data provision step". The second dyeing step performed in S6 of FIGS. 3 and 4 is an example of the "second dyeing step". The processing of acquiring the second result color information in S7 of FIGS. 3 and 4 is an example of the "second result color information acquisition step". The processing of comparing the information of the predetermined color and the second result color information in S10 of FIGS. 3 and 4 is an example of the "comparison step". The processing of correcting the dyeing data in S12 of FIGS. 3 and 4 is an example of the "correction step". The processing of providing dyeing data in S15 of FIG. 3 is an example of the "correction data provision step". The processing of transmitting and acquiring the result in S20 of FIG. 4 is an example of the "result transmission step" and the "result acquisition step". The processing of updating the database in S13 of FIG. 3 and S21 of FIG. 4 is an example of the "data update step".

What is claimed is:

1. A dyeing data management method performed between a plurality of dyeing systems disposed at different locations, wherein each of the dyeing systems includes:

a printing device that prints a dye on a base body;
a transfer device that transfers the dye to a lens in a state where the lens faces the base body on which the dye is printed;
a dye fixing device that heats the lens to which the dye is transferred to fix the dye to the lens;
a color information measuring instrument that measures color information of the lens to which the dye is fixed; and
a controller, and the dyeing data management method comprises:
a first dyeing step of dyeing a lens using a first printing device, a first transfer device, and a first dye fixing device of a first dyeing system out of the plurality of dyeing systems;
a first result color information acquisition step of acquiring first result color information, which is color information of the lens dyed in the first dyeing step, using a first color information measuring instrument of the first dyeing system;
a dyeing data creation step of creating dyeing data, which defines a discharge amount of dye on a base body by the printing device for dyeing a lens to a predetermined color to be dyed, based on a discharge amount of dye discharged from the first printing device in the first dyeing step and the first result color information acquired in the first result color information acquisition step;
a data provision step of providing the dyeing data for dyeing a lens to the predetermined color, from the first dyeing system to a second dyeing system which is one out of the plurality of dyeing systems;
a second dyeing step of performing dyeing of the lens according to the provided dyeing data, using a second printing device, a second transfer device, and a second dye fixing device of the second dyeing system; and
a second result color information acquisition step of acquiring second result color information, which is color information of the lens dyed in the second dyeing step, using a second color information measuring instrument of the second dyeing system.

2. The dyeing data management method according to claim 1, further comprising:
a comparison step of comparing the second result color information acquired in the second result color information acquisition step with information of the predetermined color.

3. The dyeing data management method according to claim 2, further comprising:
a correction step of correcting the dyeing data based on a comparison result in the comparison step to bring a color of a lens dyed in a subsequent dyeing step in the second dyeing system closer to the predetermined color.

4. The dyeing data management method according to claim 3,
wherein the controller of the first dyeing system acquires the second result color information from the second dyeing system, and carries out the comparison step and the correction step based on the acquired second result color information.

5. The dyeing data management method according to claim 4, further comprising:
a correction data provision step of providing the dyeing data corrected in the correction step, from the first dyeing system to the second dyeing system.

6. The dyeing data management method according to claim 3,
wherein the controller of the second dyeing system carries out the comparison step and the correction step.

7. The dyeing data management method according to claim 6, further comprising:
a result transmission step of transmitting at least one of the comparison result in the comparison step and a correction result of the dyeing data in the correction step to the controller of the first dyeing system,
wherein the controller of the second dyeing system carries out the result transmission step.

8. The dyeing data management method according to claim 3, further comprising:
a data update step of updating the dyeing data in a database that stores the dyeing data of the plurality of dyeing systems based on a correction result, in a case where the dyeing data is corrected in the correction step.

9. The dyeing data management method according to claim 3,
wherein in the dyeing data creation step, dyeing data is created for each type of a lens to be dyed,
in the data provision step, the dyeing data is provided to the second dyeing system in association with a type of a lens to be dyed, and
in the second dyeing step, a lens with a type corresponding to the dyeing data is dyed according to the dyeing data.

10. A dyeing system that dyes a lens, comprising:
a printing device that prints a dye on a base body:
a transfer device that transfers the dye to a lens in a state where the lens faces the base body on which the dye is printed:
a dye fixing device that heats the lens to which the dye is transferred to fix the dye to the lens;
a color information measuring instrument that measures color information of the lens to which the dye is fixed; and
a controller,
wherein the dyeing system carries out:
a dyeing step of dyeing the lens using the printing device, the transfer device, and the dye fixing device;
a first result color information acquisition step of acquiring first result color information, which is color information of the lens dyed in the dyeing step, using the color information measuring instrument;
a dyeing data creation step of creating dyeing data, which defines a discharge amount of dye on the base body by the printing device for dyeing a lens to a predetermined color to be dyed, based on a discharge amount of dye discharged from the printing device in the dyeing step and the first result color information acquired in the first result color information acquisition step;
a data provision step of providing the dyeing data for dyeing a lens to the predetermined color to another dyeing system;
a second result color information acquisition step of acquiring second result color information, which is color information of a lens actually dyed by the another dyeing system according to the dyeing data, from the another dyeing system;
a comparison step of comparing the second result color information acquired in the second result color information acquisition step with information of the predetermined color, and a correction step of correcting the dyeing data based on a comparison result in the comparison step to bring a color of a lens dyed in a subsequent dyeing step in the another dyeing system closer to the predetermined color.

11. A dyeing system that dyes a lens, comprising:
a printing device that prints a dye on a base body;
a transfer device that transfers the dye to a lens in a state where the lens faces the base body on which the dye is printed:
a dye fixing device that heats the lens to which the dye is transferred to fix the dye to the lens;
a color information measuring instrument that measures color information of the lens to which the dye is fixed; and
a controller,
wherein the dyeing system carries out:
 a dyeing data acquisition step of acquiring information of a predetermined color to be dyed and dyeing data, which defines a discharge amount of dye on the base body by the printing device for dyeing a lens to the predetermined color, from another dyeing system;
 a dyeing step of performing dyeing of a lens according to the dyeing data, using the printing device, the transfer device, and the dye fixing device;
 a result color information acquisition step of acquiring result color information, which is color information of the lens dyed in the dyeing step, using the color information measuring instrument;
 a comparison step of comparing the result color information acquired in the result color information acquisition step with information of the predetermined color; and
 a correction step of correcting the dyeing data based on a comparison result in the comparison step to bring a color of a lens dyed in a subsequent dyeing step closer to the predetermined color.

* * * * *